United States Patent
Zurmuehle et al.

(12) 
(10) Patent No.: US 6,644,371 B2
(45) Date of Patent: Nov. 11, 2003

(54) DRIVE DEVICE FOR A HANDHELD HEATER UNIT

(75) Inventors: Walter Zurmuehle, Kaegiswil (CH); Bruno von Wyl, Kaegiswil (CH)

(73) Assignee: Leister Process Technologies (CH)

(*) Notice: Subject to any disclaimer, the term of this patent is extended or adjusted under 35 U.S.C. 154(b) by 27 days.

(21) Appl. No.: 10/137,893

(22) Filed: May 2, 2002

(65) Prior Publication Data

US 2002/0189766 A1 Dec. 19, 2002

(30) Foreign Application Priority Data

May 3, 2001 (EP) .............................. 01110751

(51) Int. Cl.⁷ ............................................... B32B 31/00
(52) U.S. Cl. ...................... 156/499; 156/574; 156/577
(58) Field of Search .......................... 156/82, 361, 497, 156/499, 544, 574, 579, 580, 582, 583.1

(56) References Cited

U.S. PATENT DOCUMENTS

| | | | |
|---|---|---|---|
| 4,737,213 A | 4/1988 | Paeglis et al. | |
| 5,399,226 A | 3/1995 | Chapman | |
| 5,569,352 A | * 10/1996 | Johansen et al. | ........... 156/499 |
| 6,170,550 B1 | 1/2001 | Niederberger | |

FOREIGN PATENT DOCUMENTS

| | | |
|---|---|---|
| CH | 688581 | 11/1997 |
| DE | 1942722 | 7/1966 |
| FR | 1431056 | 1/1965 |

OTHER PUBLICATIONS

"Documentation 12B/Leister–Varient/Leister–Kombi", Leister, France XP002178787, Seite 1 –Seite 20; Abbiildungen.

"Warmgas–Schweissgerat "Plastherm" (DBHM)", Messer Griesheim GMBH, Germany XP002178788, 001801, Seite1 –Seite 4; Abbildungen 2,3.

* cited by examiner

*Primary Examiner*—James Sells
(74) *Attorney, Agent, or Firm*—Bachman & LaPointe

(57) ABSTRACT

Drive device for a handheld heater unit for welding plastic sealing webs and sheets, which is equipped with a heater device for heating the plastic sealing webs and sheets which are to be welded. The drive device has an elongate housing with a pressure-exerting and driving roller, by means of which the joining force can be applied in the vertical direction with respect to the plastic sealing webs and sheets. Furthermore, there is a coupling unit for joining the housing to the heater unit, in such a manner that the longitudinal axes of the housing and of the heater unit run substantially parallel to one another. In the housing there is a motor, which drives the pressure-exerting and driving roller, the height and/or distance of which with respect to the heater device is adjustable. The drive device together with a corresponding heater unit allows quicker, more accurate and therefore better-quality welding of the plastic sealing webs and sheets in manual welding applications, since the user only has to concentrate on applying the joining force. It is therefore possible to produce welds on plastic sealing webs and sheets on inclined and vertical walls, overhead, in U-shaped recesses or grooves and in corner regions.

8 Claims, 6 Drawing Sheets

DRIVE DEVICE FOR A HANDHELD HEATER UNIT

BACKGROUND OF THE INVENTION

The present invention relates to a drive device for a handheld heater unit for welding plastic sealing webs and sheets which is equipped with a heater device for heating the plastic sealing webs and sheets which are to be welded.

Handheld devices for welding plastic sealing webs and sheets are generally known and generally have an elongate housing for accommodating the control and drive units which are required. Depending on the design of the heater device heater units are divided into hot-air heater units and heating-wedge heater units and combinations thereof. In the hot-air heater units, air is heated and a specially designed welding tip is used to heat the material which is to be welded and—depending on the particular design—the tip. The air can be generated in the housing of the heater unit or externally. In the latter case, the air is supplied to the heater device arranged in the heater unit by means of a hose. In the case of the heating-wedge units, a heating wedge for welding the material is heated electrically. The application of pressure to the heated plastic webs is effected by means of a handheld roller which is to be guided by the user's other hand.

Welding units of this type are used in particular when it is impossible to use automatic welding machines, which move forward automatically. This is the case when the weld seams are relatively short, the weld seam is not accessible on account of obstacles, such as for example walls, to an automatic welding machine on account of its width, when welding relatively long vertical or near-vertical surfaces or during overhead welding, in particular in tunnel construction.

To weld plastic sealing webs and sheets on vertical or near-vertical surfaces at maximum height of approx. 20 cm from the floor, it is possible for this to be carried out by means of a device described in CH 688 581 A5. This device has a chassis which has a drive device, and the chassis moves on the floor along the surface which is to be welded. The welding device is pressed by hand onto the vertical or inclined wall, in order to press together the plastic webs which have been heated by the heater device by means of a pressure-exerting roller which runs with it.

Therefore, the present invention is based on the object of proposing a possibility which allows a continuous welding process and an improved quality of weld when welding plastic sealing webs and sheets by means of handheld welding units.

SUMMARY OF THE INVENTION

According to the invention, this object is achieved by a drive device for a handheld heater unit for welding plastic sealing webs and sheets, which is equipped with a heater unit for heating plastic sealing webs and sheets which are to be welded, which drive device comprises an elongate housing with a pressure-exerting and driving roller arranged at the lower end thereof for applying a joining force to the plastic sealing webs and sheets in a vertical direction with respect thereto, a motor arranged in the housing for driving the pressure-exerting and driving roller, and a coupling unit for connecting the housing to the heater unit, such that longitudinal axes of the housing and the heater unit run substantially parallel to one another.

According to the invention, the drive device has an elongate housing which is designed to be sufficiently stable for it to be possible for the joining force required during welding to be applied to the plastic sealing webs and sheets in the vertical direction with respect thereto. The introduction of forces onto the materials is effected by means of a pressure-exerting and driving roller which is arranged at the lower end of the housing and is driven by means of a motor arranged in the housing. The drive device also has a coupling unit for connecting the housing to the heater unit. The coupling unit is designed in such a manner that the longitudinal axes of the housing of the drive device and of the heater unit run substantially parallel to one another. It is preferable for the height and/or distance of the pressure-exerting and driving roller with respect to the heater device to be adjustable. The pressure-exerting and driving roller may be arranged directly in the longitudinal axis of the housing or may be offset with respect thereto.

The substantially parallel arrangement of the drive device with respect to the handheld heater unit, which is usually also elongate, allows welding of plastic sealing webs and sheets to be carried out as close as possible to the edges and corners using this device even in the case of surfaces which are at right angles to one another. The minimum distance for the weld seam from a wall is determined by the diameter of the heater unit. The greater the inclination of the longitudinal axis of the housing and of the heater unit with respect to one another, the greater the distance between the wall and the seam which is still to be welded using this device becomes. The drive device has a single roller which forms both the pressure-exerting roller and the driving roller. The connection of the housing to the heater unit by the coupling unit means that the drive device is fixedly connected to the heater unit, and the joining force is applied to the plastic sealing webs and sheets in the vertical direction by pressing onto the housing of the drive device, after the plastic sealing webs and sheets have been heated appropriately by the heater unit in the region of the overlapping ends of the plastic sealing webs and sheets which are to be welded. In this way, the overall arrangement allows easier welding with improved quality on vertical walls or in tunnel construction.

Therefore, the drive device allows handheld welding with an improved welding quality and at a higher speed. The heater unit and the corresponding heater device, for example tip or heating wedge, are also moved continuously with the movement of the pressure-exerting and driving roller. The rotational speed of the pressure-exerting and driving roller can be adjusted variably according to the material; according to one design, there is a control device which keeps the rotational speed constant even when the pressure exerted by the operator drops. In this way, the process is optimized, since the operator only has to concentrate on applying the pressure, while the second welding parameter, namely speed, is regulated or controlled by the drive device, and the third parameter, namely temperature, is controlled or regulated by the heater unit (in a known and customary way).

The use of the drive device also provides a visual quality improvement, which makes its presence felt in particular, for example, in swimming pools, since compared to a weld seam which is produced using a handheld roller, the surface looks more even, and the stripes which are at an angle to the weld seam and which often occur during handheld rolling do not occur when the melt is rolled out.

It is preferable for there to be a guiding aid to the side of the pressure-exerting and driving roller, in order to reduce the tilting of the pressure-exerting and driving roller during the welding process. This can be effected, for example, by a supporting ring or an additional supporting roller. This ensures that, during the movement of the drive device, the largest possible pressure-exerting area acts on the material, and the user does not tilt the entire device excessively through the lever arm, which is relatively great on account of the structure, which would have an adverse effect on the quality of the weld seam.

In a further refinement, the pressure-exerting and driving roller is mounted in a swinging manner. This makes it possible to compensate for slight tilting by the operator when the joining force is being applied. In particular, a supporting aid is then no longer required. The swinging mounting may be produced, for example, using the bearing arrangement of the swinging roller described in EP949057A1. Another possibility is to form a swinging head in the longitudinal axis of the housing with corresponding angular gears for transmitting the driving force.

According to a further advantageous configuration, the angle between the pressure-exerting and driving roller and the overlapping edge is adjustable. During the therefore slightly inclined forward movement, the operator is forced to counteract this by the application of lateral pressure. Therefore, during the forward movement the material is pulled toward the overlap edge, and the formation of creases is avoided.

According to a particularly preferred embodiment, the pressure-exerting and driving roller is mounted resiliently, so that when the joining force is being applied the heater device can adjust to unevenness, and the load of the joining force is not applied to the heater device. The resilient mounting can be produced either by direct resilient mounting of the pressure-exerting and driving roller or by resilient mounting of the housing of the drive device, which is rigidly connected to the pressure-exerting and driving roller, with respect to the heater unit.

BRIEF DESCRIPTION OF THE DRAWINGS

The invention is explained in more detail below with reference to exemplary embodiments and in conjunction with the appended drawings, in which.

DETAILED DESCRIPTION

Figure 1:
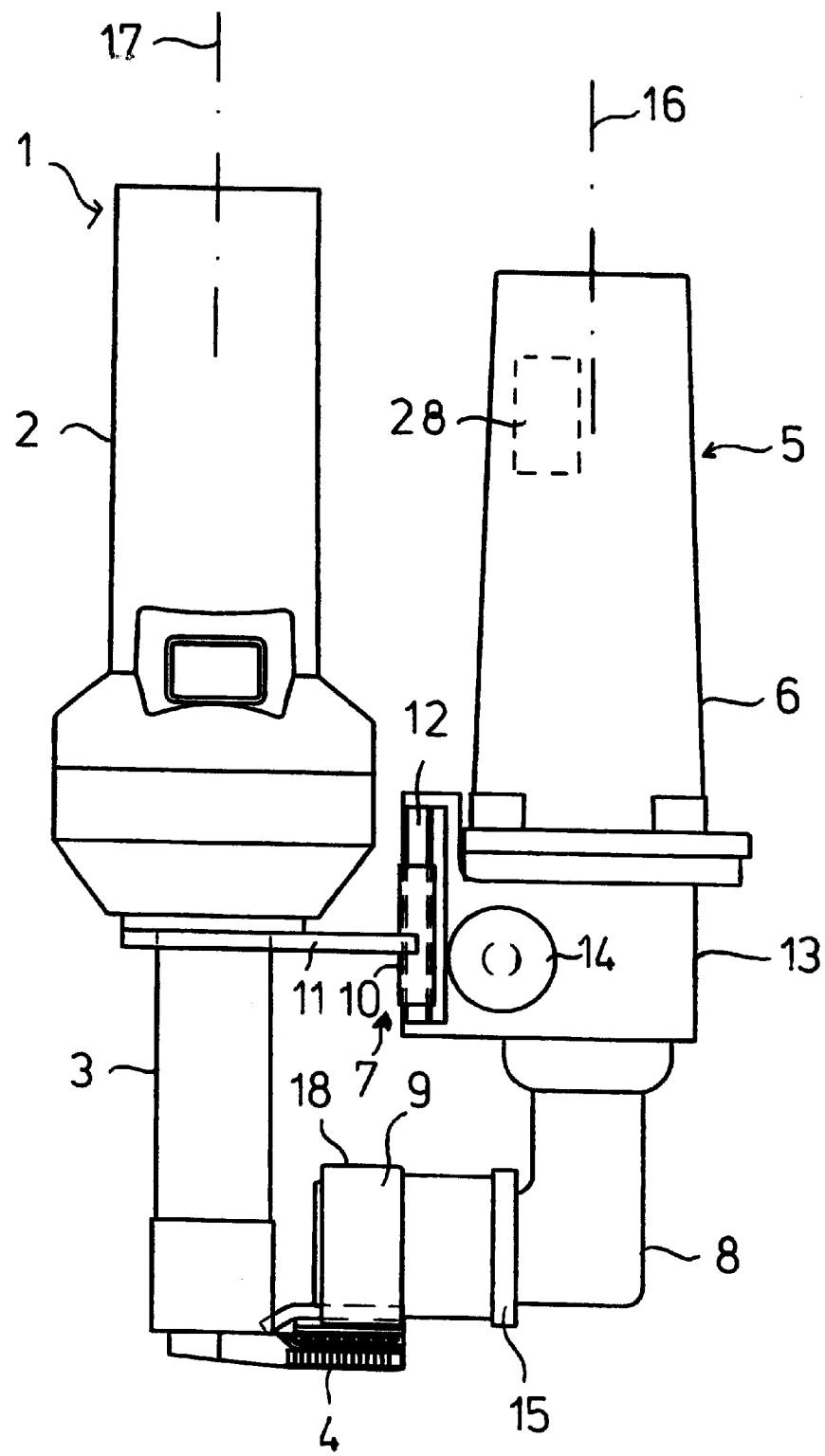
FIG. 1 diagrammatically depicts a front view of a drive device with a handheld heater unit.
Figure 2:
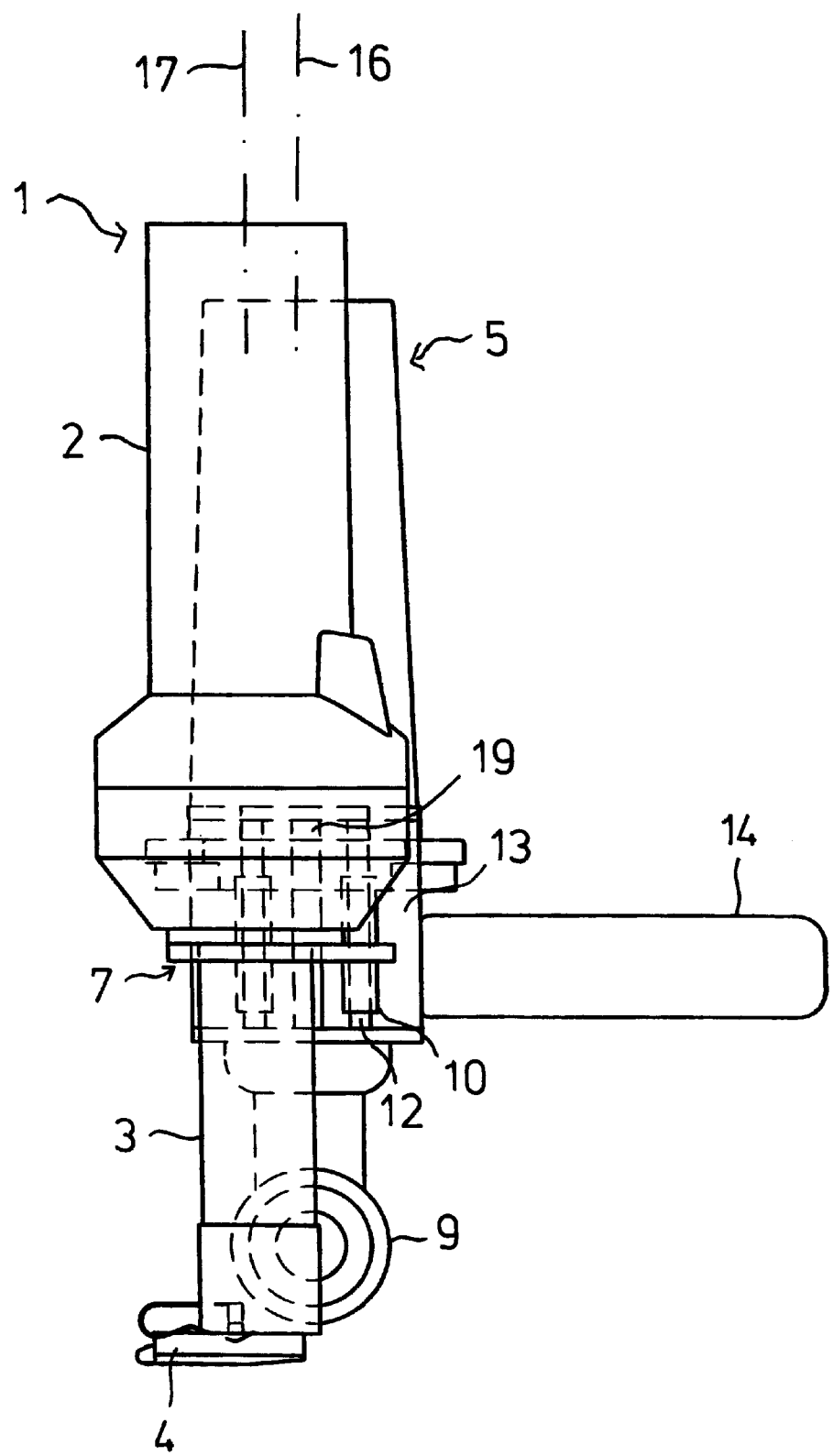
FIG. 2 shows a side view of the arrangement illustrated in FIG. 1.

FIGS. 1 and 2 show a hot-air welding unit 1, which in the housing 2 has a blower which blows air through the heater tube 3 and the tip 4. The hot air heats the tip 4 and the materials which are to be welded to one another in a known way, the edges of the materials which are to be welded overlapping one another. Furthermore, FIGS. 1 and 2 show a drive device 5 having a likewise elongate housing 6 which is connected to the hot-air welding unit 1 via a coupling unit 7. In the hot-air welding unit 1 and drive device 5 illustrated in FIGS. 1 and 2, the longitudinal axis 16 of the drive device 5 runs parallel to the longitudinal axis 17 of the hot-air welding unit 1. This arrangement, compared to other positions of the longitudinal axis 16, 17 with respect to one another, allows the closest approach to obstacles, for example vertical walls.

The housing 6 is angled off at the lower end 8 and, at the free end, bears a pressure-exerting and driving roller 9. In the housing 6 and the angled-off lower end 8 of the housing there is a commercially available motor (not shown) and a corresponding commercially available angular gear. If the motor is arranged in the region of the lower end 8 of the housing 6, the gear may, if appropriate, be dispensed with, or a gear which is customary to the person skilled in the art may be used. The housing 5 also holds a control device 28, which is diagrammatically indicated and ensures that the rotational speed of the motor remains constant irrespective of the joining force applied by the operator. As is also the case in known handheld pressure-exerting rollers, the pressure-exerting and driving roller 9 is exchangeable, so that the rubber covering can be renewed or replaced by other materials or coverings with different hardnesses or surface properties, such as for example perforations.

In the exemplary embodiment, the coupling unit 7 is connected to the hot-air welding unit via a web 11 which is arranged fixedly on the heating tube 3. The other end of the web 11 is mounted resiliently on a flange 13 via sleeves 10, which can be moved in the axial direction on a rod 12, and a coil spring 19 (FIG. 2). In the case of the tips which are described below in connection with the FIGS. 4 to 6, the spring force ensures, independently of the joining force which is applied, that the tip exerts a constant pressure in the lower material and therefore produces the desired contact and roughening. The housing of the drive device can be rotated with respect to the flange 13 of the coupling unit 7, around the longitudinal axis 16 of housing 6, so that any desired angle of the pressure-exerting and driving roller 9 with respect to the tip 4 or weld edge of materials can be set. The distance of the pressure-exerting and driving roller 9 with respect to the welding tip 4 can be adjusted by means of the coupling unit 7. The height may also be adjusted. On the flange 13, there is also a handle 14, which can be used to apply the desired joining force.

Parallel to the pressure-exerting and driving roller 9, at a distance therefrom, there is a rotatable supporting roller 15 as a guiding aid. Naturally, the supporting roller 15 may also be arranged further away from the pressure-exerting and driving roller 9 than the arrangement illustrated in the figure. For example, it is also possible for the supporting roller 15 to be arranged on the right next to the housing 6 in FIG. 1. The diameter of the supporting roller 15 is slightly smaller than that of the pressure-exerting and driving roller 9, in order to ensure the joining force is provided by the pressure-exerting driving roller 9. In the exemplary embodiment, the bearing surface of the supporting roller 15 runs parallel to the bearing surface 18 of the pressure-exerting and driving roller 9. Under certain conditions, an inclined position of the supporting roller may also be advantageous.

As is diagrammatically indicated, in the housing 6 there is a control device, by means of which, inter alia, the rotational speed of the pressure-exerting and driving roller 9 is kept constant even when the joining force drops.

Figure 3:
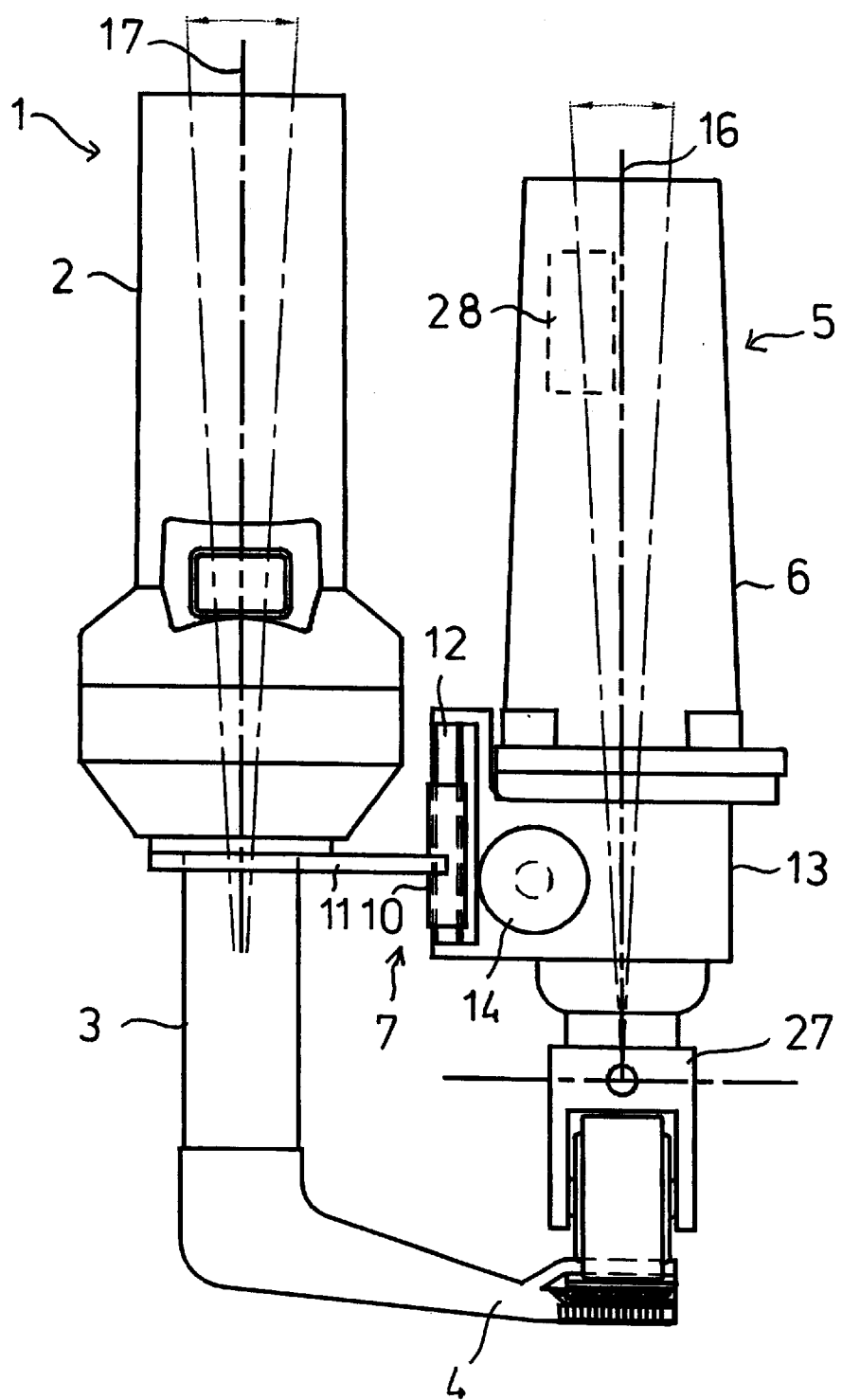
FIG. 3 shows the diagrammatic illustration as shown in FIG. 1 with a swinging head, by means of which the pressure-exerting and driving roller is mounted in a swinging manner and driven.

FIG. 3 shows an embodiment with a swinging head 27, on both sides of which a pressure-exerting and driving roller 9 is mounted. It too is driven appropriately by the motor. Therefore, the pressure-exerting and swinging roller is arranged in the longitudinal axis 16 of the housing 6. Accordingly, the tip 4 is lengthened, so that the pressure-exerting and driving roller 9 trails the tip 4 during welding.

In this embodiment, there is no need for a supporting roller 15. The joining force is applied to the weld seam to a sufficient extent even in the event of slight tilting by the operator, as indicated by the arrows in the figures. The rigid connection via the coupling unit 7 means that the entire arrangement is tilted about the longitudinal axes 16, 17.

Figure 4:
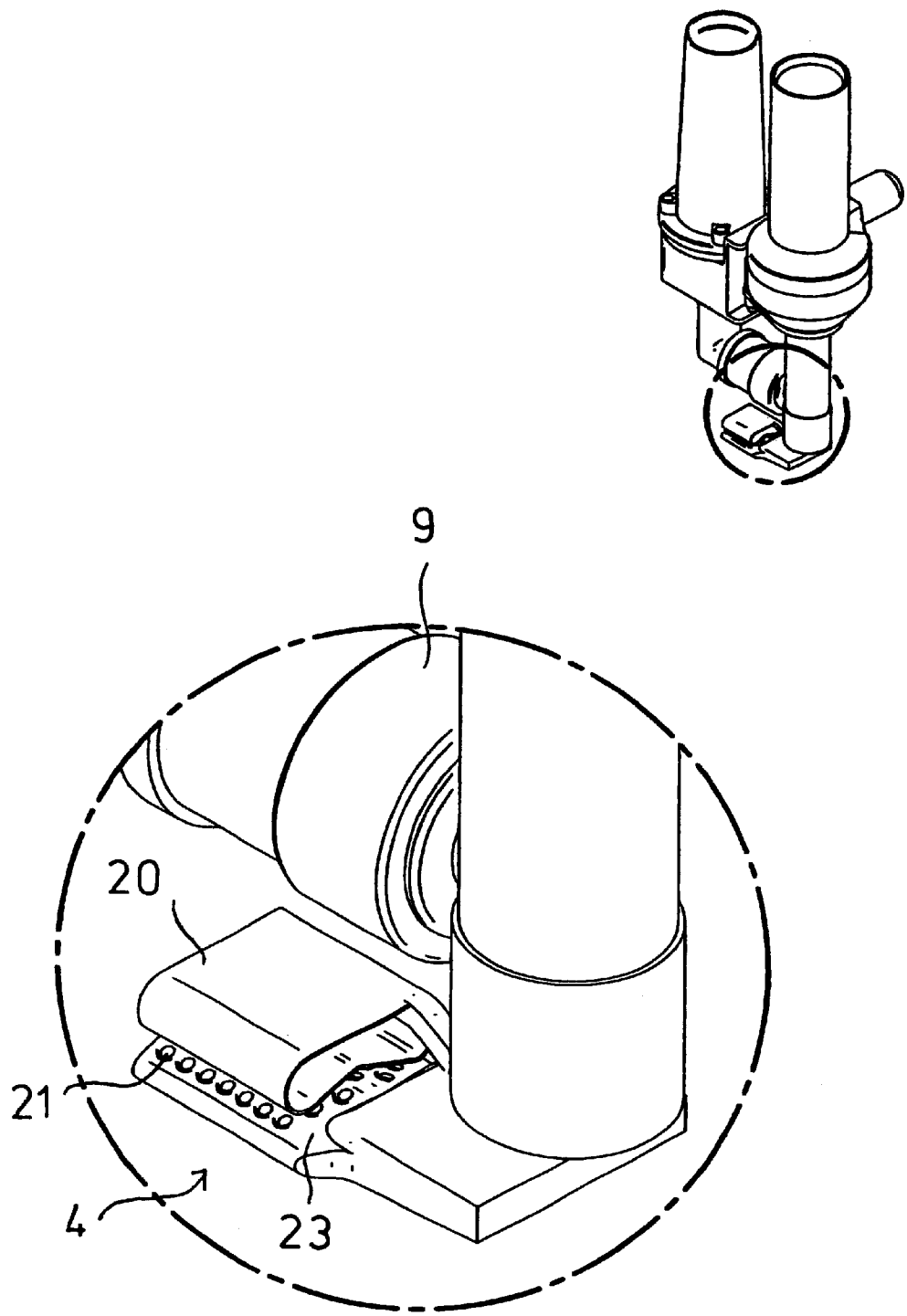
FIG. 4 shows an enlarged perspective view of the welding tip from above.
Figure 5:
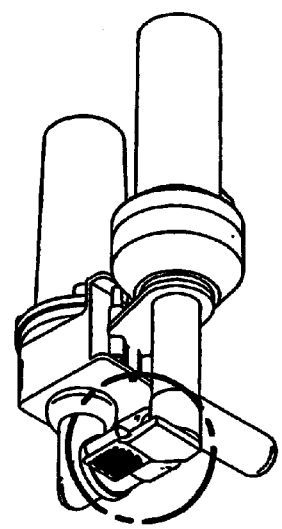
FIG. 5 shows a perspective, enlarged illustration of the welding tip from below.
Figure 5:
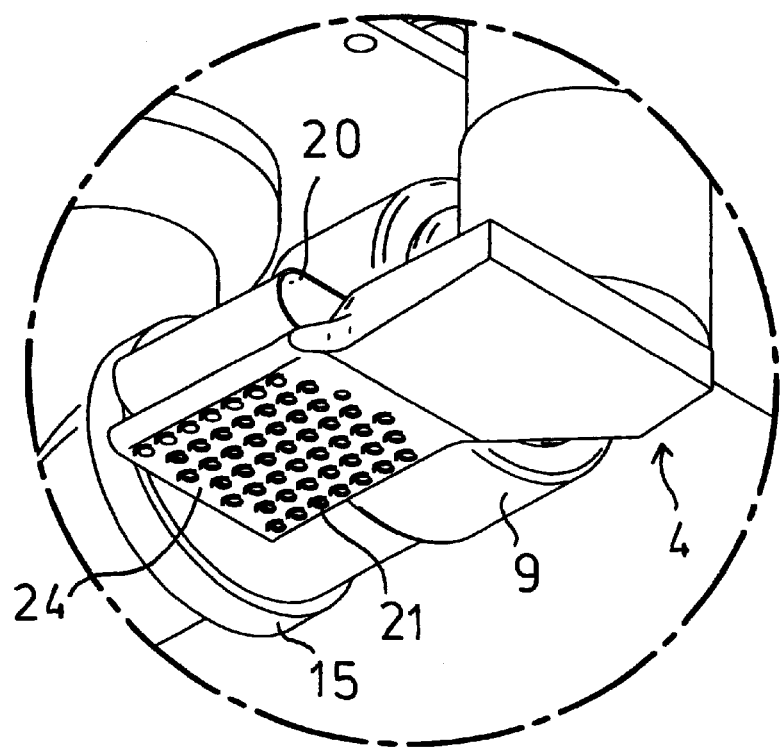
Figure 6:
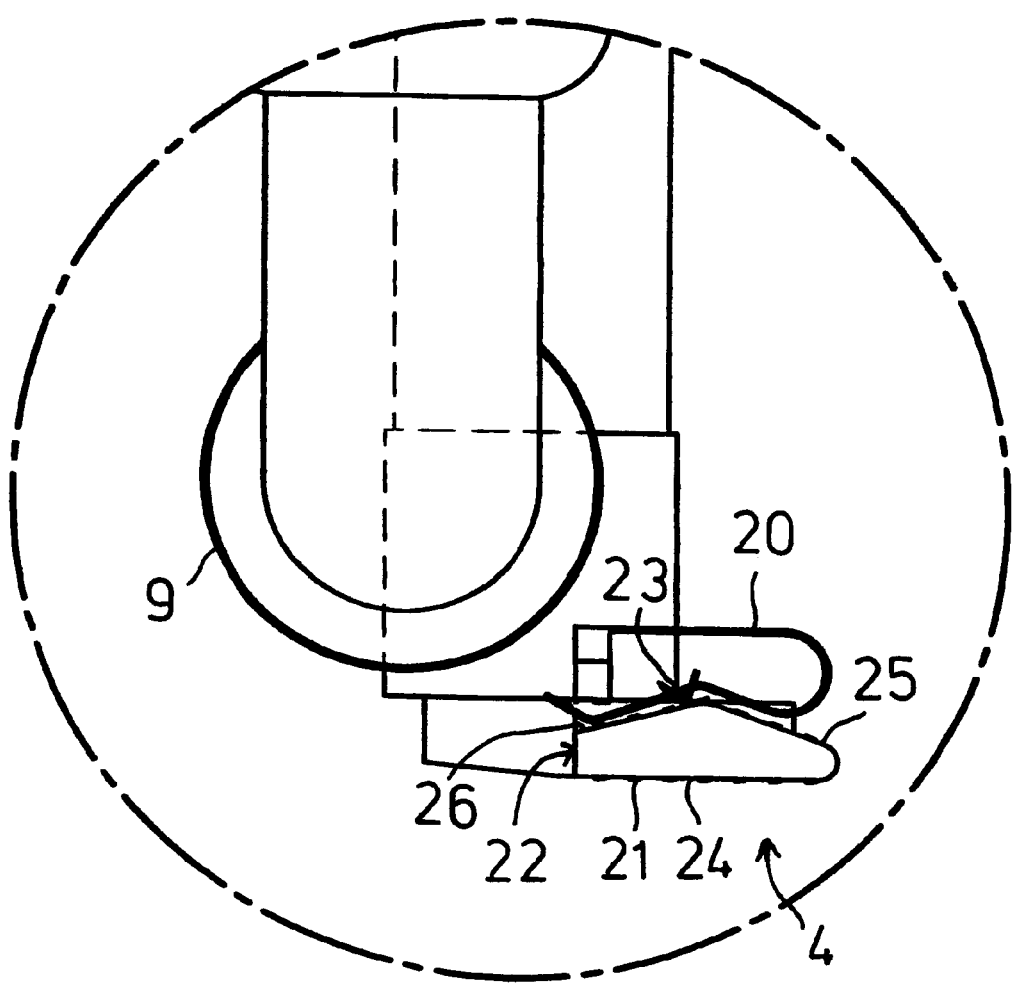
FIG. 6 shows an enlarged end view of the welding tip with pressure-exerting roller.

FIGS. 4 to 6 show various views of the tip 4, in order to clarify matters. As can be seen from the figures, the tip 4 is of triangular design, the metal guide plate 20, on its underside, corresponding to the pitched-roof design of the tip 4. The tip 4 has elevations 21, preferably sharp-edged elevations, for roughening the material, on both the upper side 23 and the underside 24. The elevations 21 on the upper side 23 cause the upper material in the overlap to be roughened, and the elevations 21 on the underside 24 cause the lower material in the overlap to be roughened. The hot air emerging through the opening 22 of the tip likewise heats the entire tip. When the materials first come into contact with the tip, the still-cold sheet is mechanically roughened at the incline 25. As the process progresses, the sheet is heated through contact with the hot upper side 23 of the tip 4, so that the material expands and becomes more flexible. Therefore, as it runs onward on the incline 26, greater roughening is effected by the penetration of the elevations 21 into the material, which has now become softer, and optimum welding is then effected. The pressure-exerting and driving roller 9 which trails the tip 4 provides the required pressure, in particular on the material which is guided over the surface of the incline 26 of the tip 4, so that in this phase the desired roughening is achieved prior to the welding. Corresponding preparation of the material can also be achieved by means of a wedge-shaped tip (not shown), in which a straight surface without elevations is arranged on the upper side 23, between the two inclined surfaces 25 and 26 shown in FIGS. 4 to 6, in order to extend the phase of material expansion and heating. On this surface, the tip has a heating-wedge action and plasticizes the material. In this way, deeper penetration of the elevations 23 is achieved on the subsequent incline 26. Compared to the known tips, which on the upper side only have a substantially horizontally arranged surface with roughening devices, this results in an improvement in quality in terms of the strength of the weld seam.

Therefore, the device described above allows welding of plastic sealing webs and sheets on inclined and vertical walls, overhead, in U-shaped recesses or grooves and in corner regions to be produced more evenly, more quickly and more accurately and also with better quality. The examples illustrated in the figures are representations of one possible preferred arrangement. Naturally, it is also possible for other weld seams or welding of webs or sheets to be carried out using the arrangement illustrated. The drive device can advantageously be retrofitted to the numerous hot-air welding units which are already in existence. As an alternative to the hot-air welding unit illustrated in the figure, it is also possible to use an arrangement which is connected to an external air-generating device. It is also possible for the drive device to be connected to a heater unit in which the heating device is designed as a heating-wedge device which is heated electrically. The individual drives, as well as electrical control means and the like, are generally known and can be varied according to the particular application.

What is claimed is:

1. A drive device for a handheld heater unit for welding plastic sealing webs and sheets, which is equipped with a heater unit for heating plastic sealing webs and sheets which are to be welded, which drive device comprises an elongate housing with a pressure-exerting and driving roller arranged at a lower end thereof for applying a joining force to the plastic sealing webs and sheets in a vertical direction with respect thereto, a motor arranged in the housing for driving the pressure-exerting and driving roller, and a coupling unit for connecting the housing to the heater unit, such that longitudinal axes of the housing and the heater unit run substantially parallel to one another.

2. The drive device as claimed in claim 1, wherein at least one of height and distance of the pressure-exerting and driving roller with respect to the heater unit is adjustable.

3. The drive device as claimed in claim 1, further comprising a guiding aid positioned relative to the pressure-exerting and driving roller for reducing tilting of the pressure-exerting and driving roller during a welding process.

4. The drive device as claimed in claim 3, wherein the guiding aid comprises a supporting roller spaced relative to the pressure-exerting and driving roller.

5. The drive device as claimed in claim 1, wherein the pressure-exerting and driving roller is movably mounted relative to the housing.

6. The drive device as claimed in claim 1, wherein the pressure-exerting and driving roller is rotable around the longitudinal axis of the housing relative to the heater unit, whereby an angle defined between the heater unit and the pressure-exerting and driving roller is adjustable.

7. The drive device as claimed in claim 1, wherein the pressure-exerting and driving roller is mounted resiliently with respect to the heater unit.

8. The drive device as claimed in claim 1, further comprising a control device associated with the pressure-exerting and driving roller for keeping rotational speed of the pressure-exerting and driving roller constant irrespective of joining force.

* * * * *